United States Patent
Gasparakis

(10) Patent No.: US 12,360,804 B2
(45) Date of Patent: Jul. 15, 2025

(54) DATA DEPENDENCY-AWARE SCHEDULING

(71) Applicant: ADVANCED MICRO DEVICES, INC., Santa Clara, CA (US)

(72) Inventor: Harris Gasparakis, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 47 days.

(21) Appl. No.: 18/091,441

(22) Filed: Dec. 30, 2022

(65) Prior Publication Data

US 2024/0220314 A1 Jul. 4, 2024

(51) Int. Cl.
G06F 9/48 (2006.01)
G06F 9/52 (2006.01)

(52) U.S. Cl.
CPC ............ *G06F 9/4881* (2013.01); *G06F 9/522* (2013.01)

(58) Field of Classification Search
CPC .............................. G06F 9/4881; G06F 9/522
See application file for complete search history.

(56) References Cited

U.S. PATENT DOCUMENTS

| | | | | |
|---|---|---|---|---|
| 2012/0320070 A1* | 12/2012 | Arvo | ..................... | G06F 9/5033 345/522 |
| 2016/0180486 A1 | 6/2016 | Rao et al. | | |
| 2016/0267622 A1* | 9/2016 | Brothers | ............... | H04N 23/741 |
| 2016/0321777 A1 | 11/2016 | Jin et al. | | |
| 2018/0349145 A1* | 12/2018 | Tye | ....................... | G06F 9/3838 |
| 2021/0182072 A1* | 6/2021 | Ashkar | ..................... | G06T 1/20 |
| 2021/0326750 A1 | 10/2021 | Shah et al. | | |
| 2021/0334933 A1* | 10/2021 | Strauss | ..................... | G06T 1/20 |
| 2022/0058053 A1 | 2/2022 | Andrei et al. | | |
| 2022/0350683 A1* | 11/2022 | Surendran | ............... | G06F 8/453 |

FOREIGN PATENT DOCUMENTS

CN 115185860 10/2022

OTHER PUBLICATIONS

A. Abdolrashidi et al., "Wireframe: Supporting Data-dependent Parallelism through Dependency Graph Execution in GPUs," 2017 Micro, pp. 600-611, [online], [retrieved on Jun. 11, 2024]. Retrieved from the Internet <URL: https://ieeexplore.ieee.org/document/8686594/references#references>.*

(Continued)

*Primary Examiner* — Shawn Doman

(57) ABSTRACT

A processing system flexibly schedules workgroups across kernels based on data dependencies between workgroups to enhance processing efficiency. The workgroups are partitioned into subsets based on the data dependencies and workgroups of a first subset that produces data are scheduled to execute immediately before workgroups of a second subset that consumes the data generated by the first subset. Thus, the processing system does not execute one kernel at a time, but instead schedules workgroups across kernels based on data dependencies across kernels. By limiting the sizes of the subsets to the amount of data that can be stored at local caches, the processing system increases the probability that data to be consumed by workgroups of a subset will be resident in a local cache and will not require a memory access.

22 Claims, 11 Drawing Sheets

(56) References Cited

OTHER PUBLICATIONS

Chen et al. "Improving GPGPU Performance via Cache Locality Aware Thread Block Scheduling," in IEEE Comp. Arch. Letters, vol. 16, No. 2, pp. 127-131, 2017, [online], [retrieved on Jun. 11, 2024]. From the Internet <URL: https://ieeexplore.ieee.org/stamp/stamp.jsp?tp=&arnumber=7898501><DOI: 10.1109/LCA.2017.2693371>.*

International Search Report and Written Opinion issued in Application No. PCT/US2023/086048, mailed May 9, 2024, 11 pages.

Binas, Jonathan and Yoshua Bengio, "Low-memory convolutional neural networks through incremental depth-first processing," 2018, 9 pages.

Qiao et al., "From Loop Fusion to Kernel Fusion: A Domain-Specific Approach to Locality Optimization," 2019 IEEE/ACM International Symposium on Code Generation and Optimization (CGO), 2019, pp. 242-253, doi: 10.1109/CGO.2019.8661176.

Jia et al. "Enabling Efficient Fast Convolution Algorithms on GPUs via MegaKernels." IEEE Transactions on Computers 69 (2020): 986-997. DOI:10.1109/TC.2020.2973144. 12 pages.

Alwani, Manoj et al. "Fused-layer CNN accelerators." 2016 49th Annual IEEE/ACM international Symposium on Microarchitecture (MICRO) (2016): 12 pages.

Ashari, Arash, et al. "On Optimizing Machine Learning Workloads via Kernel Fusion." Proceedings of the 20th ACM SIGPLAN Symposium on Principles and Practice of Parallel Programming, Jan. 2015. https://doi.org/10.1145/2688500.2688521. 10 pages.

Müller, Thomas, et al. "Real-Time Neural Radiance Caching for Path Tracing." ACM Transactions on Graphics, vol. 40, No. 4, Jul. 2021, pp. 1-16. https://doi.org/10.48550/arXiv.2106.12372. 16 Pages.

Müller, T. et al., "tiny-cuda-nn/src/fully_fused_mlp.cu" tiny-cuda-nn (Version 1.7) [Computer software], GitHub, 2021, <https://github.com/NVlabs/tiny-cuda-nn/blob/39df2387a684e4fe0cfa33542aebf5eab237716b/src/fully_fused_mlp.cu>, Accessed Mar. 16, 2023, 19 pages.

Harris, Mark and Kyrylo Perelygin, "Cooperative Groups: Flexible CUDA Thread Programming," NVIDIA Developer, Technical Blog, 2017, <https://developer.nvidia.com/blog/cooperative-groups/>, Accessed Mar. 16, 2023, 7 pages.

Klenk, Benjamin, et al. "An in-network architecture for accelerating shared-memory multiprocessor collectives." 2020 ACM/IEEE 47th Annual International Symposium on Computer Architecture (ISCA). IEEE, 2020.

U.S. Appl. No. 18/091,443, filed Dec. 30, 2022, listing Suchita Pati et al. as inventors, entitled "Dynamic Control of Work Scheduling".

* cited by examiner

DATA DEPENDENCY-AWARE SCHEDULING

BACKGROUND

Processing units such as a graphics processing unit (GPU) or other parallel processor or a central processing unit (CPU) typically implement multiple processing elements (referred to as compute units in the case of the GPU and processor cores in the case of a CPU) that execute instructions concurrently or in parallel. For example, the compute units in a GPU execute a kernel including a number of workgroups, each workgroup including a number of threads, as multiple threads executing the same instructions on different data sets. The instructions in the kernel represent shaders that perform graphics processing, neural networks that perform machine learning tasks, and the like. A processing unit also includes a command processor that fetches commands from command buffers, allocates resources, and schedules the commands for execution on one or more of the processing elements in the processing unit. Some applications require the resources of more than one processing unit. For example, machine learning applications that are implemented using neural networks can be implemented using several GPUs operating in parallel. The GPUs communicate with each other by sending data to buffers on other GPUs and then signaling the other GPU to announce that the data is available in the buffer. However, conventional approaches to scheduling kernels can, for some sets of operations, require a large number of memory fetch cycles relative to the number of compute cycles, can result in bottlenecks as data size and device count grow, and can result in uneven resource utilization, thereby negatively impacting processor performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
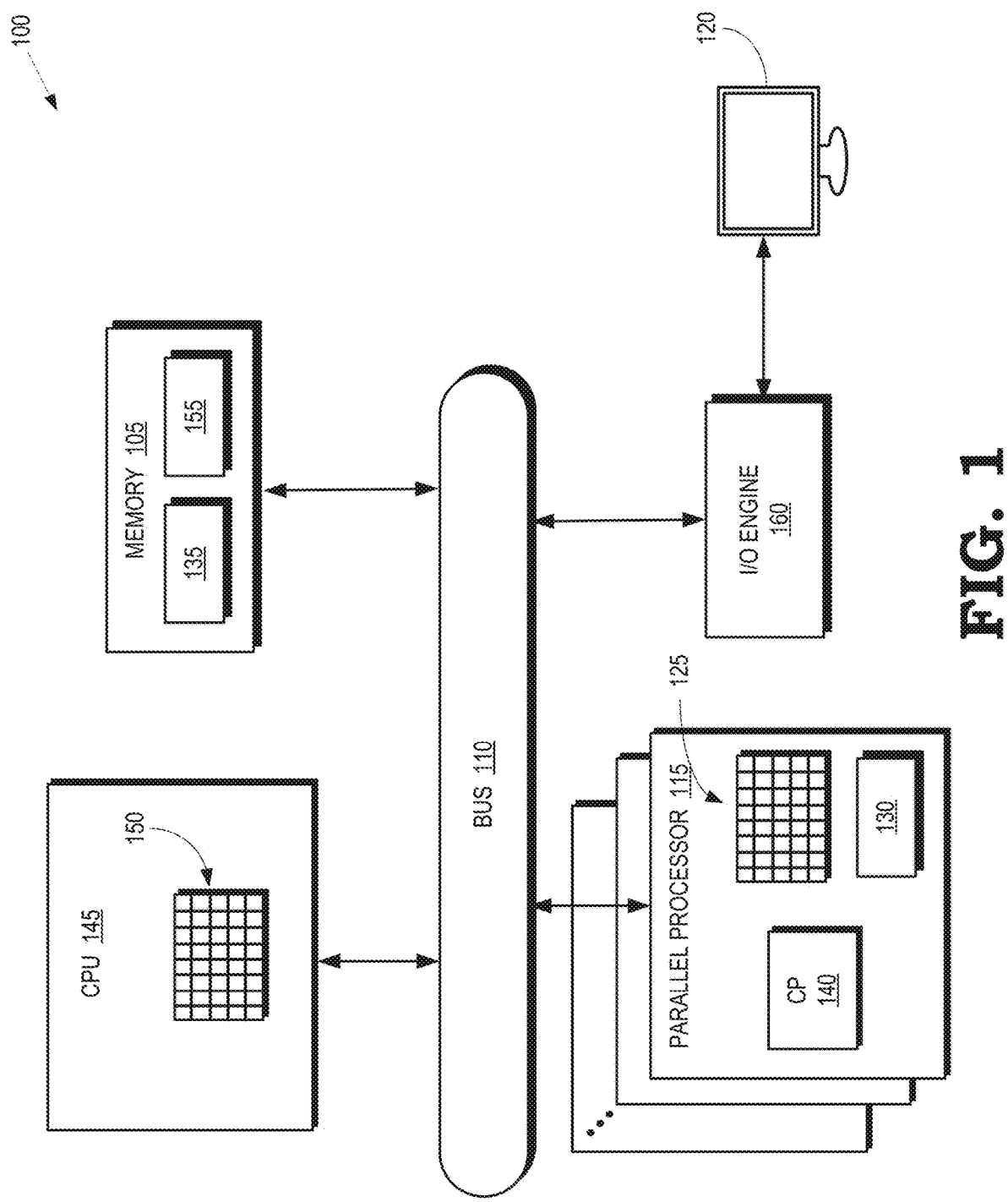
FIG. 1 is a block diagram of a processing system implementing data dependency-aware scheduling in accordance with some embodiments.

Conventional hardware scheduling for parallel processors such as GPUs takes a relatively inflexible approach to executing kernels. For example, when a programmer launches a kernel by specifying the number of workgroups and the number of threads in each workgroup of the kernel, the workgroups are typically scheduled to execute at the compute units of the parallel processor one entire layer after the other (referred to herein as "breadth-first" scheduling). Each layer typically produces more data than can fit in a local cache (i.e., a cache that is proximal and exclusive to a compute unit executing the workgroups) and often consumes data produced by previously executed layers in the same order. Data that does not fit within the local cache is stored at one or more shared levels of cache or memory. Therefore, a subsequent layer or kernel that depends on data produced by a previous layer or kernel is unlikely to find the data at the local cache and must instead retrieve the data from another level of a cache hierarchy or memory, resulting in increased latency and lower processing performance.

For example, a dispatch of a grid of work items (also referred to herein as threads or streams) corresponding to, e.g., pixels of a display, accesses a data set stored at a cache of a parallel processing unit. Some data sets, such as surfaces or textures, are modified and read by successive dispatches. For example, a first dispatch, referred to as a producer dispatch, writes data to the cache, and subsequent dispatches, referred to as consumer/producer dispatches, read and modify the data written by the producer dispatch. A consumer dispatch reads data written by a previous dispatch. However, the amount of data that can be stored at the cache is constrained by the size of the cache, and the amount of data produced by a producer dispatch frequently exceeds the storage capacity of the cache, resulting in "thrashing" of the cache. Such data is often evicted from the cache before it can be read by a subsequent dispatch.

An inflexible approach to scheduling kernels can also negatively impact resource utilization. For example, multiple workgroups within a kernel or between two or more kernels may utilize different resources, such as different memory channels, of a parallel processor. By scheduling such workgroups successively, the other resources of the parallel processor may remain idle. By extension, workgroups that are scheduled to execute across multiple parallel processors, such as communication/reduction operations, can cause bottlenecks as data size and device count grow and can result in inefficient resource utilization, e.g., by leaving the devices idle during communication between devices and leaving the network idle while the devices execute operations.

FIGS. 1-13 illustrate techniques for flexibly scheduling workgroups within a kernel, across kernels, within a parallel processor, and across multiple parallel processors based on data dependencies between workgroups to enhance processing efficiency. A configurable scheduling mechanism of a processing system partitions the workgroups into subsets referred to herein as "generalized regions of interest" (GROI) based on the data dependencies and schedules workgroups of a first GROI that produces data to execute immediately before workgroups of a second GROI that consumes the data generated by the first GROI. For example, in the context of image processing, a GROI may be a tile of an image. In the context of a convolutional neural network, a GROI may be a subset of filters.

In some embodiments, the first GROI includes workgroups of a first kernel and the second GROI includes workgroups of a second kernel. For example, in some embodiments the processing system schedules a first subset of workgroups of a first kernel to execute, followed by a second subset of workgroups of the second kernel that consumes the data produced by the first subset of workgroups. The processing system may then schedule a third subset of workgroups of a third kernel that consumes the data produced by the second subset of workgroups or, in some embodiments, another subset of workgroups of the first kernel, followed by another subset of workgroups of the second kernel, executing through a graphics pipeline one subset of workgroups at a time. Thus, the processing system does not execute one kernel at a time, but instead schedules workgroups across multiple kernels based on data dependencies across kernels, without waiting for all workgroups of a kernel to complete execution before scheduling a subset of workgroups from another kernel (referred to herein as "depth-first" scheduling). By limiting the size of the GROIs to the amount of data that can be stored at local caches, the processing system increases the probability that data to be consumed by workgroups of a GROI will be resident in a local cache and will not require a memory access. Further, by scheduling subsets of workgroups active in a kernel which are using different resources, such as different memory channels, the processing system enables the workgroups to utilize resources of the parallel processor more effectively.

In some embodiments, a programmer indicates data dependencies between workgroups in an application programming interface (API). The processing system then generates a command describing pairings of two or more kernels based on the indicated data dependencies and schedules one or more workgroups of the first GROI and one or more workgroups of the second GROI to execute at a processor based on the command. In some embodiments, the command and an identifier of a kernel launch for the workgroups of the first GROI and workgroups of the second GROI are placed in a ring buffer and a command processor schedules the workgroups based on the command and the identifier.

In some embodiments, a programmer indicates data generation ordering requirements of a producer kernel that includes a plurality of workgroups that generate blocks of data. The indication of data generation ordering requirements is included in metadata for the producer kernel in some embodiments. In some embodiments, the scheduler specifies during launch of the producer kernel that data generated by the producer kernel is to be generated in a particular order based on another kernel to be launched prior to, concurrently with, or subsequent to the producer kernel. For example, a subsequent kernel is an all-reduce in some embodiments. A scheduler receives the indication and schedules the plurality of workgroups of the producer kernel to execute in an order to generate the blocks of data starting with an initial block of data based on the indication.

In some embodiments, a neural network is implemented on multiple parallel processors, such as GPUs, of the processing system, such that each processor executes the same producer (e.g., a general matrix multiplication (GEMM)) operation and is followed by execution of the reduction operation, such as an all-reduce operation, using the compute units of the parallel processors. As used herein, an "all-reduce operation" is defined as a reduction operation that combines multiple data inputs from the producer operations of each processor into a single data output using an arithmetic and/or logical operator possibly followed by a broadcast of the single data set. In a ring-based all-reduce operation, a parallel processor receives data from a previous parallel processor, reduces the received data with its own data, and then sends the reduced data to the next parallel processor. In such a case, scheduling all workgroups of the producer operation first followed by all workgroups of the consumer all-reduce operation can cause underutilization/idling of compute and network resources.

To enhance processing efficiency of an all-reduce operation across multiple parallel processors, in some embodiments the parallel processors of a processing system schedule a first set of workgroups (GROI) of the producer operations which is immediately followed by a second GROI of the all-reduce operation that consumes the data generated by first GROI. Thus, the steps of the all-reduce operation are coordinated among the parallel processors to overlap computations with communication between parallel processors, resulting in accelerated execution of workloads and more efficient resource utilization.

In some embodiments, the processing system includes a scheduling mechanism for producing data for fine-grained producers, such as for communication across devices to enable overlapping of the producer computation with all-reduce's communication across the network. This scheduling mechanism enables a first parallel processor to schedule and execute a first set (GROI) of workgroups (blocks) of the producer operation to generate data for transmission to a second parallel processor in a desired traffic pattern. At the same time, the second parallel processor schedules and executes a different GROI of the producer operation to generate data for transmission in a desired traffic pattern to a third parallel processor or back to the first parallel processor. In some embodiments, the scheduling mechanism schedules the workgroups of a producer kernel to execute in a first order at the first parallel processor and in a second order at the second parallel processor. In some embodiments, a different workgroup order is scheduled by having multiple versions or kernel implementations of the same operation in the command/packet queued in the buffer, one of which is dynamically selected to generate the desired traffic.

In some embodiments, multiple kernels are scheduled for computation across multiple chiplets of a chiplet-based device in a manner that efficiently utilizes inter-chiplet bandwidth. For example, in some embodiments, a first kernel is scheduled at a first chiplet that primarily accesses local resources such as memory during a time that a second kernel is scheduled at a second chiplet that is expected to generate significant inter-chiplet traffic. Similarly, in embodiments involving multiple concurrently executing kernels, the scheduling mechanism selects kernels for scheduling based on whether the kernels are latency-aware or resource-aware and based on whether operations are executing in isolation or concurrently.

FIG. 1 is a block diagram of a processing system 100 configured to implement data dependency-aware scheduling in accordance with some embodiments. The processing system 100 is generally configured to execute sets of instructions (e.g., programs) or commands (e.g., draw commands) to carry out tasks on behalf of an electronic device. Accordingly, in different embodiments the processing system 100 is incorporated into one of a variety of electronic devices, such as a desktop computer, laptop computer, server, smartphone, tablet, game console, and the like.

The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes one or more parallel processors 115 that are configured to render images for presentation on a display 120. A parallel processor is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). Although the below description uses a graphics processing unit (GPU), for illustration purposes, the embodiments and implementations described below are applicable to other types of parallel processors.

The parallel processor 115 can render objects to produce values of pixels that are provided to the display 120, which uses the pixel values to display an image that represents the rendered objects. Some embodiments of the parallel processor 115 can also be used for general purpose computing. For example, the parallel processor 115 can be used to implement machine learning algorithms such as neural networks. In some cases, operations of multiple parallel processors 115 are coordinated to execute the machine learning algorithm, e.g., if a single parallel processor 115 does not possess enough processing power to run the machine learning algorithm on its own. The multiple processors 115 communicate over one or more interfaces (not shown in FIG. 1 in the interest of clarity).

The parallel processor 115 implements multiple processing elements (also referred to as compute units) 125 that are configured to execute instructions concurrently or in parallel. The parallel processor 115 also includes an internal (or on-chip) memory 130 that includes a local data store (LDS), as well as caches, registers, or buffers utilized by the compute units 125. The internal memory 130 stores data structures that describe tasks executing on one or more of the compute units 125. In the illustrated embodiment, the parallel processor 115 communicates with the memory 105 over the bus 110. However, some embodiments of the parallel processor 115 communicate with the memory 105 over a direct connection or via other buses, bridges, switches, routers, and the like. The parallel processor 115 can execute instructions stored in the memory 105 and the parallel processor 115 can store information in the memory 105 such as the results of the executed instructions. For example, the memory 105 can store a copy 135 of instructions from a program code that is to be executed by the parallel processor 115 such as program code that represents a machine learning algorithm or neural network. The parallel processor 115 also includes a command processor 140 that receives task requests and dispatches tasks to one or more of the compute units 125. The command processor 140 is a set of hardware configured to receive the commands from the CPU 145 and to prepare the received commands for processing. For example, in some embodiments the command processor 140 buffers the received commands, organizes the received commands into one or more queues for processing, performs operations to decode or otherwise interpret the received commands, and the like.

In some embodiments, the parallel processor 115 implements a graphics pipeline (not shown in FIG. 1 in the interest of clarity) that includes multiple stages configured for concurrent processing of different primitives in response to a draw call. Stages of the graphics pipeline in the parallel processor 115 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

The processing system 100 also includes a central processing unit (CPU) 145 that is connected to the bus 110 and communicates with the parallel processor 115 and the memory 105 via the bus 110. In the illustrated embodiment, the CPU 145 implements multiple processing elements (also referred to as processor cores) 150 that are configured to execute instructions concurrently or in parallel. The CPU 145 can execute instructions such as program code 155 stored in the memory 105 and the CPU 145 can store information in the memory 105 such as the results of the executed instructions. The CPU 145 is also able to initiate graphics processing by issuing commands or instructions (which are sometimes referred to herein as "draw calls") to the parallel processor 115.

An input/output (I/O) engine 160 handles input or output operations associated with the display 120, as well as other elements of the processing system 100 such as keyboards, mice, printers, external disks, and the like. The I/O engine 160 is coupled to the bus 110 so that the I/O engine 160 communicates with the memory 105, the parallel processor 115, or the CPU 145.

In operation, the CPU 145 issues draw calls to the parallel processor 115 to initiate processing of a kernel that represents the program instructions that are executed by the parallel processor 115. Multiple instances of the kernel, referred to herein as threads or work items, are executed concurrently or in parallel using subsets of the compute units 125. In some embodiments, the threads execute according to single-instruction-multiple-data (SIMD) protocols so that each thread executes the same instruction on different data. The threads are collected into workgroups that are executed on different compute units 125. For example, the command processor 140 can receive the draw calls and schedule tasks for execution on the compute units 125.

To enhance processing efficiency, the command processor 140 is configured to receive a command inserted in a kernel packet indicating dependencies between workgroups of one or more kernels. For example, the command may indicate that one workgroup of kernel 2 depends on two workgroups of kernel 1. Based on the command, the command processor 140 enqueues workgroups of the one or more kernels for a hardware scheduler (not shown) to dispatch the workgroups to compute units 125 of the parallel processor 115, as described in more detail with respect to FIG. 3.

Figure 2:
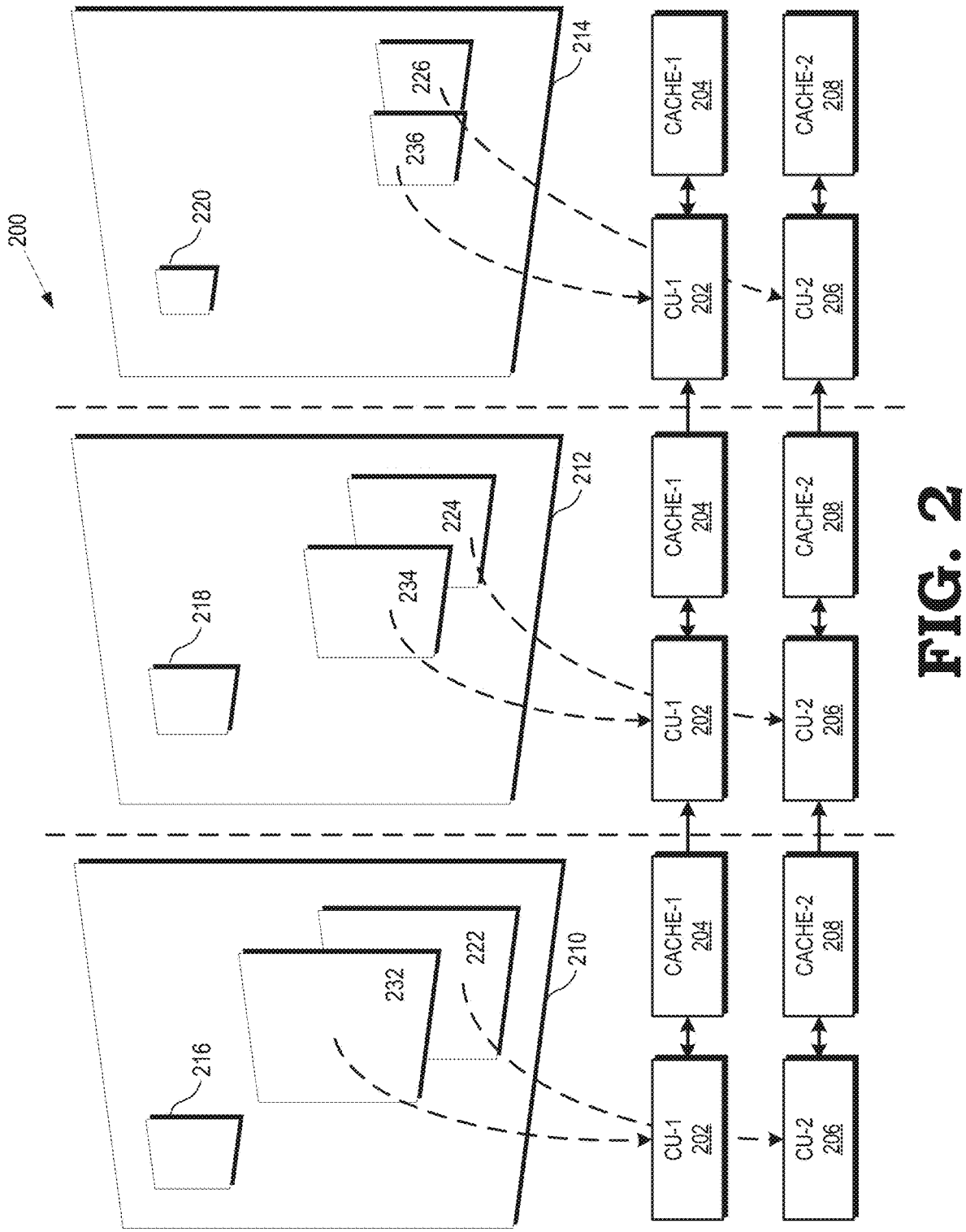
FIG. 2 is a diagram of a convolution having data dependencies between workgroups of multiple layers in accordance with some embodiments.

FIG. 2 is a diagram of an execution path 200 of convolutional layers 210, 212, 214 having data dependencies between workgroups of the layers in accordance with some embodiments. In some embodiments, a programmer or an API declares dependencies between workgroups of the convolutional layers 210, 212, 214. In other embodiments, an inference engine (not shown) deduces dependencies between workgroups of the convolutional layers 210, 212, 214 automatically. The inference engine is an automated software framework that orchestrates the overall computation and automatically infers layers that require cross-device reductions in some embodiments. The inference engine invokes kernels with an appropriate dynamic scheduling order in some embodiments. The inference engine is implemented on the parallel processor 115, on dedicated logic (e.g., an application specific integrated circuit (ASIC)), or on other types of components, other types of logic, and/or any combination of multiple different types of components or processing units. In some embodiments, an "inference engine" is hardware and/or software that receives image data and generates one or more label probabilities for the image data.

For applications such as computer vision and machine learning, generalized regions of interest (GROIs) in one layer typically depend on GROIs in previous layers. A GROI is a multidimensional region of interest that contains rectangular constraints in height and width as well as constraints in channels (C) and batch (N) dimensions and filters (K) that are partitioned for calculation in groups. A machine learning convolutional kernel typically requires multiple workgroups to calculate the filters, and in some instances no workgroup can accommodate calculating all the filters in a GROI if the GROI is too large.

In the illustrated example, one of a programmer, the API, or the inference engine declares data dependencies indicating a producer/consumer relationship between a subset 222 of one or more workgroups of convolutional layer 210, a subset 224 of one or more workgroups of convolutional layer 212, and a subset 226 of one or more workgroups of convolutional layer 214 and between a subset 232 of one or more workgroups of convolutional layer 210, a subset 234 of one or more workgroups of convolutional layer 212, and a subset 236 of one or more workgroups of convolutional layer 214. The subset 232 of one or more workgroups overlaps the subset 222 of one or more workgroups, the subset 234 of one or more workgroups overlaps the subset 224 of one or more workgroups to a lesser extent, and the subset 236 of one or more workgroups is adjacent to but does not overlap the subset 226 of one or more workgroups.

The programmer, API, or the inference engine further declares dependencies indicating a producer/consumer relationship between a subset 216 of one or more workgroups of convolutional layer 210, a subset 218 of one or more workgroups of convolutional layer 212, and a subset 220 of one or more workgroups of convolutional layer 214. In some embodiments, the programmer, the API, or the inference engine declares data dependency patterns between workgroups that are one-to-one, N-to-one, one-to-N, or N-to-M, such that a first number of workgroups of a first layer is dependent on a second number of workgroups of a second layer. In some embodiments, the programmer, the API, or the inference engine explicitly declares data dependencies by workgroup ID. Based on the declared data dependencies, the processing system 100 schedules the workgroups such that consumer workgroups execute immediately after producer workgroups, thereby increasing the likelihood that the produced data will be found in the L1 or L2 (local) caches.

In addition to executing "depth first" rather than in "breadth-first" entire kernel order, the processing system 100 specifies how many workgroups of a data-producer kernel should be scheduled at a time to ensure that there are sufficient workgroups in flight to fully occupy assigned compute units 402. Thus, the size of a GROI is determined based on the criteria of being large enough to be partitioned into a sufficient number of workgroups to occupy most or all of the compute units CU-1 202 and CU-2 206 (each of which processes a micro-tile/micro-GROI) and being small enough to not thrash (i.e., produce data that exceeds the sizes of) their respective associated local caches, cache-1 204 and cache-2 208.

To illustrate, in an example, a machine learning pipeline includes two kernels to be executed back-to-back: kernel_1 with an input size in_1 that produces output data of size out_1, and kernel_2 with extra input data in_2 beyond the size out_1 that produces data of size out_2. Kernel_1 includes wg_1 workgroups, and kernel_2 includes wg_2 workgroups, of which M_1 workgroups of kernel_1 produce data consumed by M_2 workgroups of kernel_2. The processing system 100 calculates the memory footprint of launching m_1 workgroups of kernel_1 and ensures that all dependent workgroups of kernel_2 are processed in depth first (m_2) before continuing with the next GROI of kernel_1 as follows: m_2/m_1=M_2/M_1, so m_2=(m_1/M_1)*M_2. The processing system 100 determines that the m_1 workgroups of kernel_1 will require (m_1/M_1)*in_1 data and will produce (m_1/M_1)*out_1 data, which will be consumed immediately by the m_2 workgroups of kernel_2. Further, each workgroup of kernel_2 will also need additional data (m_2/M_2)*in_2 and produce output (m_2/M_2)*out_2. By summing the memory contributions of each GROI, the processing system 100 determines the total amount of concurrent memory needed, as a function of m_1. In some embodiments, the processing system 100 determines the global optimum of the function either by stochastic gradient descent (SGD) based on a theoretical analysis or via benchmarking in an optimization pre-processing step.

In the illustrated example, based on the declared data dependencies described above, CU-1 202 is scheduled to execute the subset 232 of one or more workgroups of convolutional layer 210 and store the data produced by the subset 232 at cache-1 204 while CU-2 206 is scheduled to execute the subset 222 of one or more workgroups of convolutional layer 210 and store the data produced by the subset 222 at cache-2 208. In some embodiments, subsets 232 and 222 are overlapping such that some workgroups are included in both subsets 232 and 222. Before the remainder of the workgroups of convolutional layer 210 execute (such as those of subset 216), CU-1 202 is scheduled to execute the subset 234 of one or more workgroups of convolutional layer 212 based on the data produced by the subset 232 and stored at cache-1 204. Data produced by the subset 234 is stored at cache-1 204 (e.g., by overwriting the data produced by the subset 232). Similarly, CU-2 206 is scheduled to execute the subset 224 of one or more workgroups of convolutional layer 212 based on the data produced by the subset 222 and stored at cache-2 208. Data produced by the subset 224 is stored at cache-2 208 (e.g., by overwriting the data produced by the subset 222). In some embodiments, subsets 234 and 224 are overlapping such that some workgroups are included in both subsets 234 and 224, but to a lesser extent than the overlap between subsets 232 and 222.

Before the remainder of the workgroups of convolutional layer 212 execute (such as those of subset 218), CU-1 202 is scheduled to execute the subset 236 of one or more workgroups of convolutional layer 214 based on the data produced by the subset 234 and stored at cache-1 204. Data produced by the subset 236 is stored at cache-1 204 (e.g., by overwriting the data produced by the subset 234). Similarly, CU-2 206 is scheduled to execute the subset 226 of one or more workgroups of convolutional layer 212 based on the data produced by the subset 224 and stored at cache-2 208. Data produced by the subset 226 is stored at cache-2 208 (e.g., by overwriting the data produced by the subset 224). In some embodiments, subsets 236 and 226 are adjacent but do not overlap. For example, if subset 236 of convolutional layer 214 includes one workgroup that calculates a 16×16 pixel microtile, the data is calculated from an 18×18 pixel microtile of subset 234 of convolutional layer 212, which in turn is calculated from a 20×20 pixel microtile of subset 232 of convolutional layer 210. Enabling multiple levels of depth-first transversal of multiple convolutional layers is implicit (e.g., a function of a runtime) in some embodiments, or explicit (e.g., from a programmer calling a runtime function) in other embodiments. In this way, the processing system 100 makes efficient use of cache-1 204 and cache-2 208.

Figure 3:
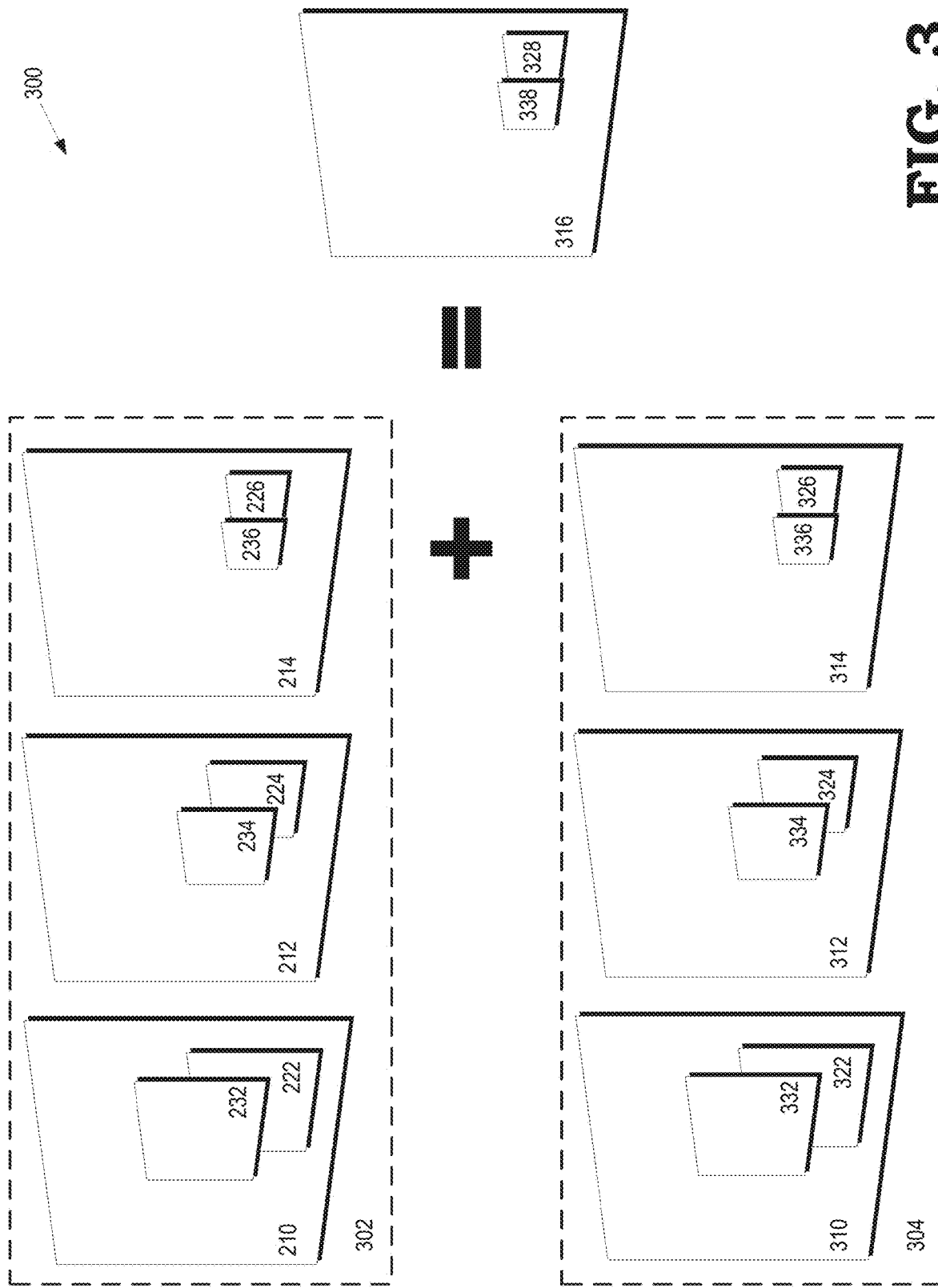
FIG. 3 is a diagram of an addition of two convolutions having data dependencies between multiple layers in accordance with some embodiments.

FIG. 3 is a diagram of a merger 300 of two execution paths 302, 304. Each of execution paths 302, 304 executes similarly to execution path 200 of FIG. 2. Thus, for example, in execution path 302, subset 222 of convolutional layer 210 executes and produces data for consumption from subset 224 of convolutional layer 212. Subset 224 is blocked, e.g., by a barrier, from starting execution until subset 222 has completed execution at a compute unit and written data to a local cache of the compute unit. Once subset 222 completes execution, the barrier is removed and subset 224 executes at the compute unit, where subset 224 consumes the data written to the local cache by subset 222 and produces data that is written to the local cache. Subset 226 is blocked from starting execution until subset 224 has completed execution. Once subset 224 completes execution, subset 226 executes at the compute unit, where subset 226 consumes the data written to the local cache by subset 224 and produces data that is stored at the local cache.

Concurrently, or at an overlapping time frame, subset 232 executes at a compute unit and produces data for consumption at a local cache of the compute unit by subset 234. Subset 234 executes at the compute unit and consumes the data produced by subset 232 and produces data for consumption at the local cache by subset 236. Subset 236 executes at the compute unit and consumes the data produced by subset 234.

A similar process occurs for execution path 304, at which subset 322 of convolutional layer 310 executes and produces data for consumption from subset 324 of convolutional layer 312. Subset 324 is blocked, e.g., by a barrier, from starting execution until subset 322 has completed execution at a compute unit and written data to a local cache of the compute unit. Once subset 322 completes execution, the barrier is removed and subset 324 executes at the compute unit, where subset 324 consumes the data written to the local cache by subset 322 and produces data that is written to the local cache. Subset 326 is blocked from starting execution until subset 324 has completed execution. Once subset 324 completes execution, subset 326 executes at the compute unit, where subset 326 consumes the data written to the local cache by subset 324 and produces data that is stored at the local cache.

Concurrently, or at an overlapping time frame, subset 332 executes at a compute unit and produces data for consumption at a local cache of the compute unit by subset 334. Subset 334 executes at the compute unit and consumes the data produced by subset 332 and produces data for consumption at the local cache by subset 336. Subset 336 executes at the compute unit and consumes the data produced by subset 334. Execution paths 302 and 304 execute concurrently in some embodiments and sequentially in other embodiments.

The execution paths 302, 304 merge with the addition of subset 236 of convolutional layer 214 and subset 336 of convolutional layer 314 to produce result 338 of convolutional layer 316. Similarly, subset 226 of convolutional layer 214 is added to subset 326 of convolutional layer 314 to produce result 328 of convolutional layer 316. The depth-first scheduling of subsets of workgroups across convolutional layers 210, 212, 214 and 310, 312, 314 increases data locality at local caches to reduce accesses to memory and latency, improving processing performance.

Figure 4:
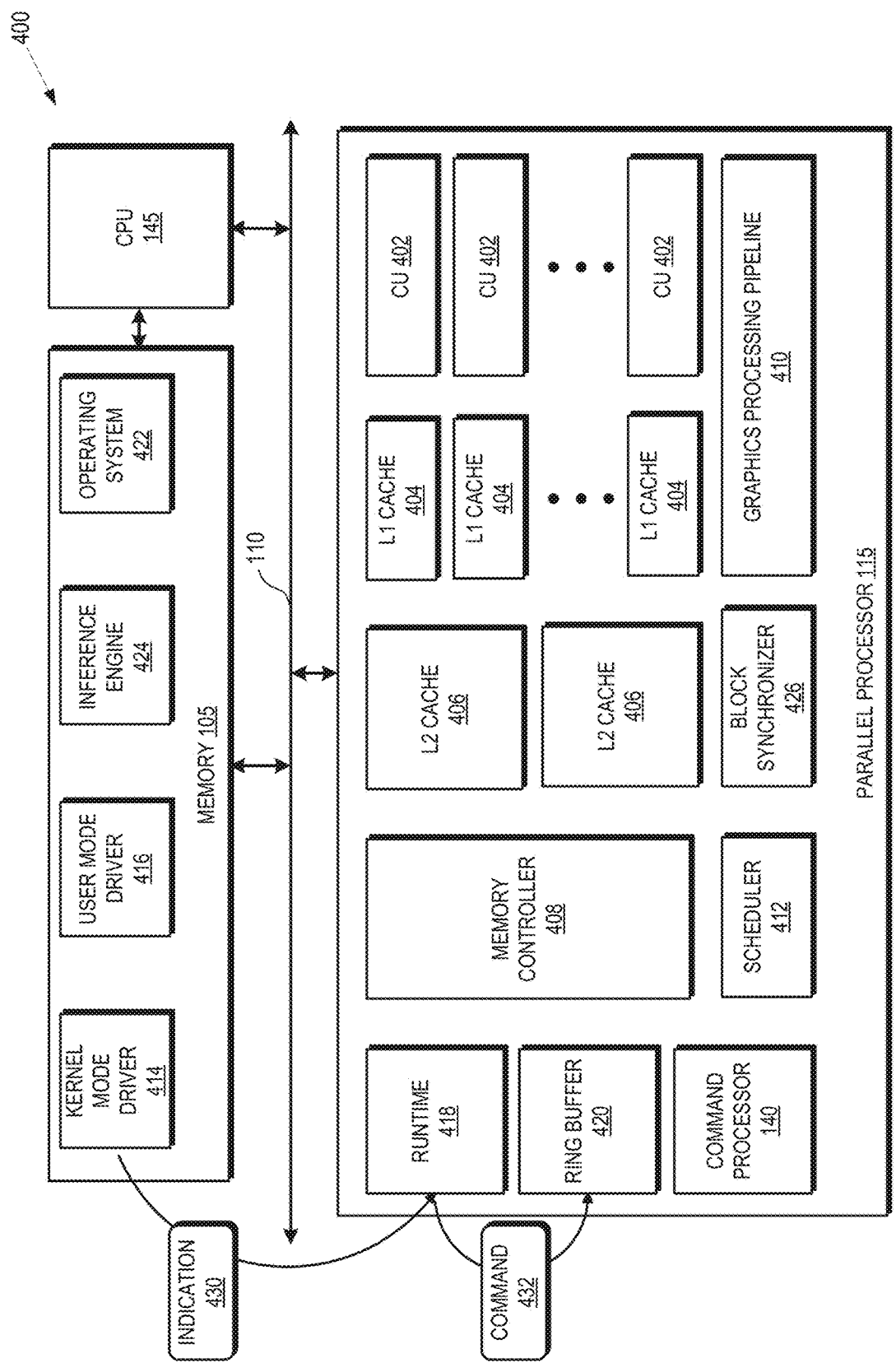
FIG. 4 is a block diagram of a portion of the processing system of FIG. 1 implementing data dependency-aware scheduling in accordance with some embodiments.

FIG. 4 is a block diagram of a portion 400 of the processing system 100 of FIG. 1 implementing data dependency-aware scheduling in accordance with some embodiments. The processing system 100 maintains, in memory 105, one or more control logic modules for execution by the processing system 100. The control logic modules include an operating system 422, a kernel mode driver 414, a user mode driver 416, and an inference engine 424. These control logic modules control various features of the operation of the CPU 145 and the parallel processor 115. For example, the operating system 422 directly communicates with hardware and provides an interface to the hardware for other software executing on the CPU 145. The kernel mode driver 414 controls operation of the parallel processor 115 by, for example, providing an API to software (e.g., applications) executing on the CPU 145 to access various functionality of the parallel processor 115. The kernel mode driver 414 also includes a just-in-time compiler that compiles programs for execution by processing components (such as compute units 402 discussed in further detail below) of the parallel processor 115.

The parallel processor 115 executes commands and programs for selected functions, such as graphics operations and non-graphics operations that are suited for parallel processing and/or non-ordered processing. The parallel processor 115 is used for executing graphics pipeline operations such as pixel operations, geometric computations, and rendering an image to display 120 based on commands received from the CPU 145. The parallel processor 115 also executes compute processing operations that are not directly related to graphics operations, such as operations related to video, physics simulations, computational fluid dynamics, or other tasks, based on commands received from the CPU 145.

The parallel processor 115 includes compute units 402 that include one or more SIMD units (not shown) that perform operations at the request of the CPU 145 in a parallel manner according to a SIMD paradigm. The SIMD paradigm is one in which multiple processing elements share a single program control flow unit and program counter and thus execute the same program but are able to execute that program with different data. In one example, each SIMD unit includes sixteen lanes, where each lane executes the same instruction at the same time as the other lanes in the SIMD unit but executes that instruction with different data. In an implementation, each of the compute units 402 can have a local L1 cache 404. In an implementation, multiple compute units 402 share an L2 cache 406.

The basic unit of execution in compute units 402 is a work-item. Each work-item represents a single instantiation of a program that is to be executed in parallel in a particular lane. Work-items can be executed simultaneously as a "wavefront" on a single SIMD processing unit. One or more wavefronts are included in a "workgroup," which includes a collection of work-items designated to execute the same program. A workgroup is executed by executing each of the wavefronts that make up the workgroup. In alternatives, the wavefronts are executed sequentially on a single SIMD unit or partially or fully in parallel on different SIMD units. A wavefront can be thought of as the largest collection of work-items that can be executed simultaneously on a single SIMD unit. Thus, if commands received from the CPU 145 indicate that a particular program is to be parallelized to such a degree that the program cannot execute on a single SIMD unit simultaneously, then that program is broken up into two or more wavefronts which are parallelized on two or more SIMD units or serialized on the same SIMD unit (or both parallelized and serialized as needed). A hardware scheduler 412 performs operations related to scheduling various wavefronts on different compute units 402 and SIMD units.

The parallelism afforded by the compute units 402 is suitable for graphics related operations such as pixel value calculations, vertex transformations, and other graphics operations. Thus, in some instances, a graphics processing pipeline 410, which accepts graphics processing commands from the CPU 145, provides computation tasks to the compute units 402 for execution in parallel.

The compute units 402 are also used to perform computation tasks not related to graphics or not performed as part of the "normal" operation of a graphics processing pipeline 410 (e.g., custom operations performed to supplement processing performed for operation of the graphics processing pipeline 410). An application (not shown) or other software executing on the CPU 145 transmits programs that define such computation tasks to the parallel processor 115 for execution.

The parallel processor 115 further includes a runtime 418, a command buffer such as a ring buffer 420, and the command processor 140. The runtime 418 is a software execution environment that interfaces between a host side program and the parallel processor 115. The runtime 418 feeds hardware queues at the ring buffer 420 with work and specifies the order in which workloads are to execute at the compute units 402.

To facilitate data dependency-aware scheduling among workgroups of one or more kernels, the user mode driver 416 receives instructions (not shown) from user processes and sends requests for work to the kernel mode driver 414. In some embodiments, the instructions include hints from the API or the inference engine 424 regarding data dependencies among workgroups of one or more kernels. The kernel mode driver 414 aggregates requests from the user mode driver 416 and feeds the requests to the ring buffer 420, which is accessible by both the CPU 145 and the parallel processor 115. The kernel mode driver 414 further provides an indication 430 of data dependencies among workgroups of one or more kernels to the runtime 418 based on information received from the API or the inference engine 424. In some embodiments, a block synchronizer 426 acts as a synchronization point for a specified subset of workgroups. The subset of workgroups is specified either explicitly or is determined via descriptors such as the active workgroups executing the current GROI.

The runtime 418 inspects the user-specified data dependency patterns and/or explicit dependencies indicated in the indication 430, and the specified subset of workgroups at the block synchronizer 426. Based on the indication 430 and/or the specified subset of workgroups, the runtime 418 generates and inserts a command 432 in a kernel packet that the runtime 418 enqueues at the ring buffer 420. The command processor 140 is configured to read kernel packets, including the command 432, from the ring buffer 420 and to consume work based on dependent workgroups of kernel groups rather than simply consuming workgroups of a kernel in linear order. The hardware scheduler 412 is configured to obey the declared data dependencies and schedule workgroups of an "in flight" kernel group at one or more of the compute units 402.

In some embodiments, the runtime 418 facilitates fine-grained control of workgroup synchronization by inserting a barrier, or memory fence, into the kernel packet containing information regarding which workgroups of a first kernel must be waited on because they produce data that will be consumed by workgroups of a second kernel. Thus, the barrier delays execution of the consumer workgroups of the second kernel until the producer workgroups of the first kernel have completed execution. By contrast, conventional scheduling techniques specify that all workgroups of a kernel complete execution before any workgroups of a subsequent kernel execute. The barrier is implemented in some embodiments using global atomics as a synchronization medium, such as by initializing a counter by the number of workgroups that must complete execution and decrementing the counter when a workgroup reaches the barrier. In other embodiments, barriers are enforced based on signaling between workgroups. For example, in some embodiments, condition variables or mwait/monitor states are programmed at the runtime 418. In other embodiments, the condition variables or mwait/monitor states are programmed explicitly in the logic of the kernels, and each workgroup asserts its completion on an interrupt line, triggering a scheduler interrupt routine. The scheduler firmware maintains a dependency tree, and then, upon satisfaction of dependencies between "producer" workgroups, schedules the execution of the "consumer" workgroups, in a compute unit that has the same access to the producer workgroups' caches (typically L2, L3, etc. caches are shared between multiple compute units).

In some embodiments, to express dependencies between workgroups of different kernels at the level of runtime calls, rather than at the level of kernel code, when declaring the consumer kernel, the runtime 418 explicitly specifies the mapping between workgroups of the producer kernel and workgroups of the consumer kernel. For example, a conventional API for launching a kernel is LaunchKernel(function_address, numBlocks, dimBlocks, args, shared MemBytes, stream).

To express dependencies between workgroups of different kernels at the level of runtime calls in which a producer kernel (kernel_1) has no dependencies and a consumer kernel (kernel_2) depends on kernel_1, an example implementation is
```
kernelID1 = DeclareKernel( function_address_1, numBlocks_1, dimBlocks_1,
   NULL, //No dependencies
   args_1, sharedMemBytes_1, stream)
kernelID2 = DeclareKernel( function_address_2, numBlocks_2, dimBlocks_2,
   {
     {
     kernelID1,
     {2,1,1},
     {1,1,1}
     }
   }
   args_2, sharedMemBytes_2, stream)
LaunchKernel(kernelID1)
LaunchKernel(kernelID2)
```

In the above example implementation, when declaring kernel_2, the runtime 418 explicitly specifies the mapping between workgroups of kernel_1 and workgroups of kernel_2, in which blocks in the "X" dimension of kernel_1 produce data for 1 block in the "X" dimension of kernel_2.

In other embodiments, a programmer implementing a kernel declares the GROI that each workgroup of the kernel calculates, for example, in a companion function for each kernel implementation:

GROIKernel 1 = DefineGROI(BlockID)

In an example implementation, given the BlockId of a workgroup, if the workgroup consumes data with addresses in a 1-dimensional tile of size 64 and calculates data in the same GROI (e.g., [BlockId*64, (BlockId+1)*64]), both the source and destination GROIs can be specified independently, as follows:

```
kernelID1 = LaunchKernel( function_address_1, numBlocks_1, dimBlocks_1,
   GROIKernel1, //The function pointer to the function that
   knows how to calculate GROIs.
   NULL, //No dependencies on other kernels
   Args_1, sharedMemBytes_1, stream)
kernelID2 = LaunchKernel( function_address_1, numBlocks_1, dimBlocks_1,
   GROIKernel2, //The function pointer to the function that
   knows how to calculate GROIs for this kernel
   { kernelID1}, //list of producer kernels for this kernel.
   args_1, sharedMemBytes_1, stream)
```

In conventional scheduling methods, workgroups of a single kernel are assigned to processing elements such as shader engines in round robin order and then launched to compute units also in round robin or similar order. In contrast, by declaring the GROI that each workgroup of the kernel calculates in a companion function for each kernel implementation, the runtime 418 and the hardware scheduler 412 can know the dependencies between workgroups of different kernels and orchestrate scheduling the workgroups on appropriate shader engines and compute units to maximize the probability of finding data for workgroup consumption in the local cache for the compute unit executing the workgroups. In some embodiments, the hardware scheduler 412 guarantees that a set of workgroups of a consumer kernel and the producer kernel workgroups from which the set of workgroups depends will execute either (1) on a set of processing elements that share an L1 cache (e.g., on the same compute unit), or (2) on a set of processing elements that share an L2 cache (e.g., the same shader engine). The command processor 140 logic uses the workgroup dependencies declared by the user or inferred by the GROI declaration and has the target shader engine obey the workgroup dependencies in some embodiments. In other embodiments, a signal mechanism such as a barrier is injected in the kernel code specifying that execution is to be delayed pending predetermined condition variables and that after execution, a signal indicating that execution has completed is to be sent.

Figure 5:
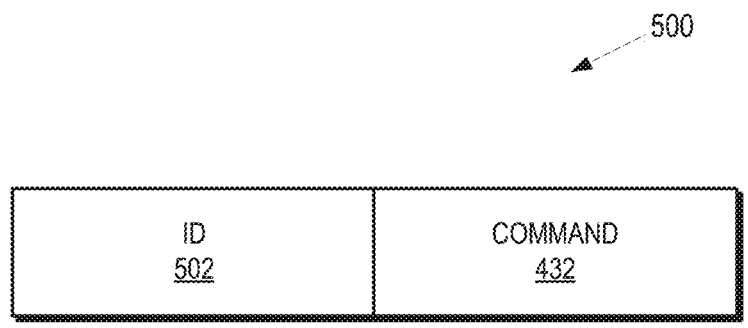
FIG. 5 is a block diagram of a data packet including a command indicating data dependencies within or between kernels in accordance with some embodiments.

FIG. 5 is a block diagram of a kernel packet 500 including a command 432 indicating data dependencies within or between kernels in accordance with some embodiments. The kernel packet 500 is a PM4 command packet in some embodiments that is created by the runtime 418 and includes a unique ID 502 for the kernel launch. The command 432 describes pairings of dependent kernels by reference to the unique IDs of dependent kernels in, e.g., a dataflow graph. For example, in some embodiments, KerRefID1_2-KerRefID2_3 means that two workgroups of a kernel with the unique ID KerRefID1 produce data that will be consumed by three workgroups of a kernel with the unique ID KerRefID2.

Figure 6:
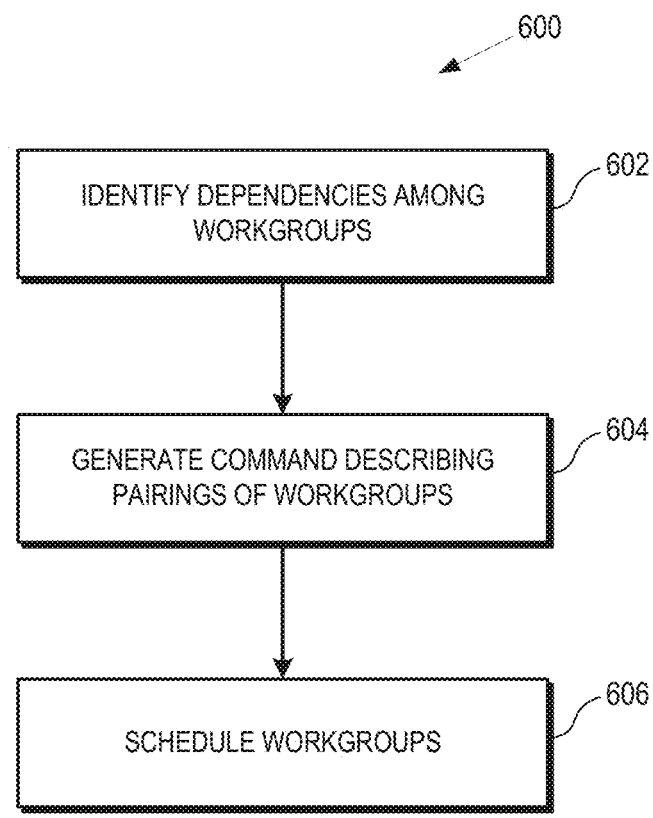
FIG. 6 is a flow diagram illustrating a method for scheduling workgroups based on data dependencies at one or more parallel processors in accordance with some embodiments.

FIG. 6 is a flow diagram illustrating a method 600 for scheduling workgroups based on data dependencies at one or more parallel processors 115 in accordance with some embodiments. In some embodiments, the method 600 is performed by a processing system such as the processing system 100 illustrated in FIG. 1. At block 602, a programmer, the API, or the inference engine 424 identifies data dependency patterns or explicit data dependencies among workgroups of one or more kernels. In some embodiments, the kernel mode driver 414 provides an indication 430 of the identified data dependencies to the runtime 418 based on information received from the API or the inference engine 424.

At block 604, the runtime 418 receives the indication 430 of the identified data dependencies and generates a command 432 describing pairings of workgroups based on the data dependencies. In some embodiments, the runtime 418 inserts the command 432 in a kernel packet and enqueues the command 432 at the ring buffer 420.

At block 606, the command processor 140 reads kernel packets, including the command 432, from the ring buffer 420 and schedules workgroups based on the identified data dependencies. The hardware scheduler 412 schedules workgroups of an "in flight" kernel group at one or more of the compute units 402 in accordance with the declared data dependencies.

Figure 7:
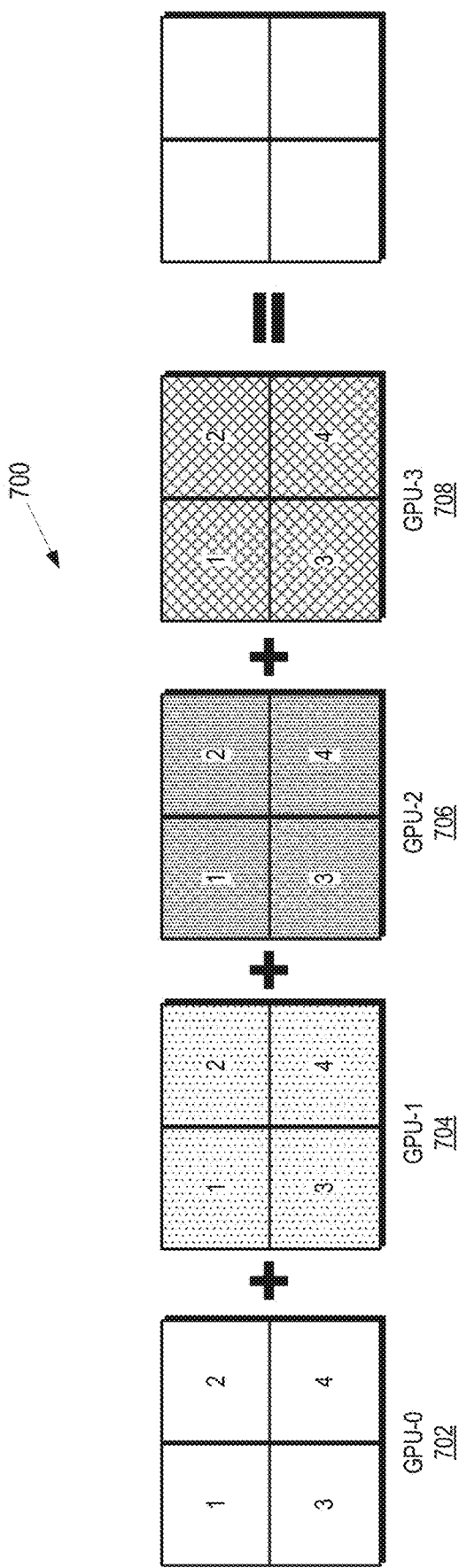
FIG. 7 is a block diagram of an all-reduce operation executed across a plurality of parallel processors.

Some machine learning applications distribute work across multiple parallel processor devices using input partitioning or data parallelism, in which devices operate on independent data and require reduction of parameter gradients across all devices before the model is updated. Alternatively, tensor slicing or model parallelism splits each layer's parameters across devices and requires reduction of output activations. FIG. 7 is a block diagram of an all-reduce operation 700 executed conventionally across a plurality of parallel processors, in which communication/reduction operations are executed as a separate kernel in GPUs after all the data (e.g., all the blocks in devices GPU-0 702, GPU-1 704, GPU-2 706, and GPU-3 708) is ready and rely on bulk all-reduce. However, such a reduction operation can result in a bottleneck as data size and device count grow and cause inefficient use of resources, as the devices are mostly idle during communication between devices and the communication network is idle while the devices compute. A fine-grained mechanism in which the data is communicated and reduced (all-reduced) by each processor as they are generated can alleviate this, however, the uniform execution order of workgroups on each parallel processing device makes it inefficient.

To illustrate the conventional fine-grained mechanism, in the example of FIG. 7, each of GPU-0 702, GPU-1 704, GPU-2 706, and GPU-3 708 generates their own version of block 1 at the same time, then block 2, then block 3, and then block 4. All the blocks of data are generated by the producer on each device, followed by an all-reduce. Numbers (1, 2, 3, 4) on each block within a device represent the order in which the blocks are generated by the producer. Thus, all of the devices are generating the same block of data at a time. To reduce the same block (e.g., block 1) of data across multiple devices (e.g., as they all generate the next block 2) requires that all the processors send their respective block 1 to a single device. In such a scenario, all the traffic will be directed to a single device at a time, causing network link inefficiencies and further, the processing system cannot leverage the reduction capability of multiple parallel devices. Another approach is to further divide the generated block 1 in each device, but the small message size and high synchronization cost can make it inefficient and slow. Thus, fine-grained overlap of computation and communication is not possible if all devices involved generate the same block of data at a time (e.g., all produce their version of block 1 first, block 2 next, and so on), as occurs with conventional compute scheduling.

To more efficiently schedule work across devices and enable overlapping of the producer computation with all-reduce's communication across the network, the processing system 100 includes a scheduling mechanism for producing data for fine-grained communication across devices. This scheduling mechanism enables the first parallel processor to schedule and execute a first set (GROI) of workgroups (blocks) of the producer operation to generate data for transmission to a second parallel processor in a desired traffic pattern. Concurrently, the second parallel processor schedules and executes a different GROI of the producer operation to generate data for transmission in a desired traffic pattern to a third parallel processor or back to the first parallel processor in some embodiments. As used herein, the term "traffic pattern" refers to a timing of data transmissions from one parallel processor to another parallel processor or among compute units of a single parallel processor. Further, it will be appreciated that in some embodiments a block includes multiple data elements and that in some embodiments the multiple data elements are generated by multiple WGs packed into a GROI.

To enable this, in some embodiments, the API specifies during kernel launch that the data generated by the kernel needs to be reduced across a specified set of parallel processors 115. Similar to the example described above with respect to FIG. 4, the runtime 418 embeds the information regarding a needed reduction as a command 432 in the kernel packet 500, which is enqueued in the ring buffer 420 or other queue of each parallel processor 115 (such as GPU-0 702, GPU-1 704, GPU-2 706, and GPU-3 708). The command processor 140 or other scheduler of each parallel processor 115 reads the command 432 from the kernel packet 500 and calculates which workgroup or sequence of workgroups to launch. The command processor 140 passes the information regarding which workgroup or sequence of workgroups to launch to the hardware scheduler 412 to start executing the workgroup from a given workgroup ID or sequence of workgroups.

Figure 8:
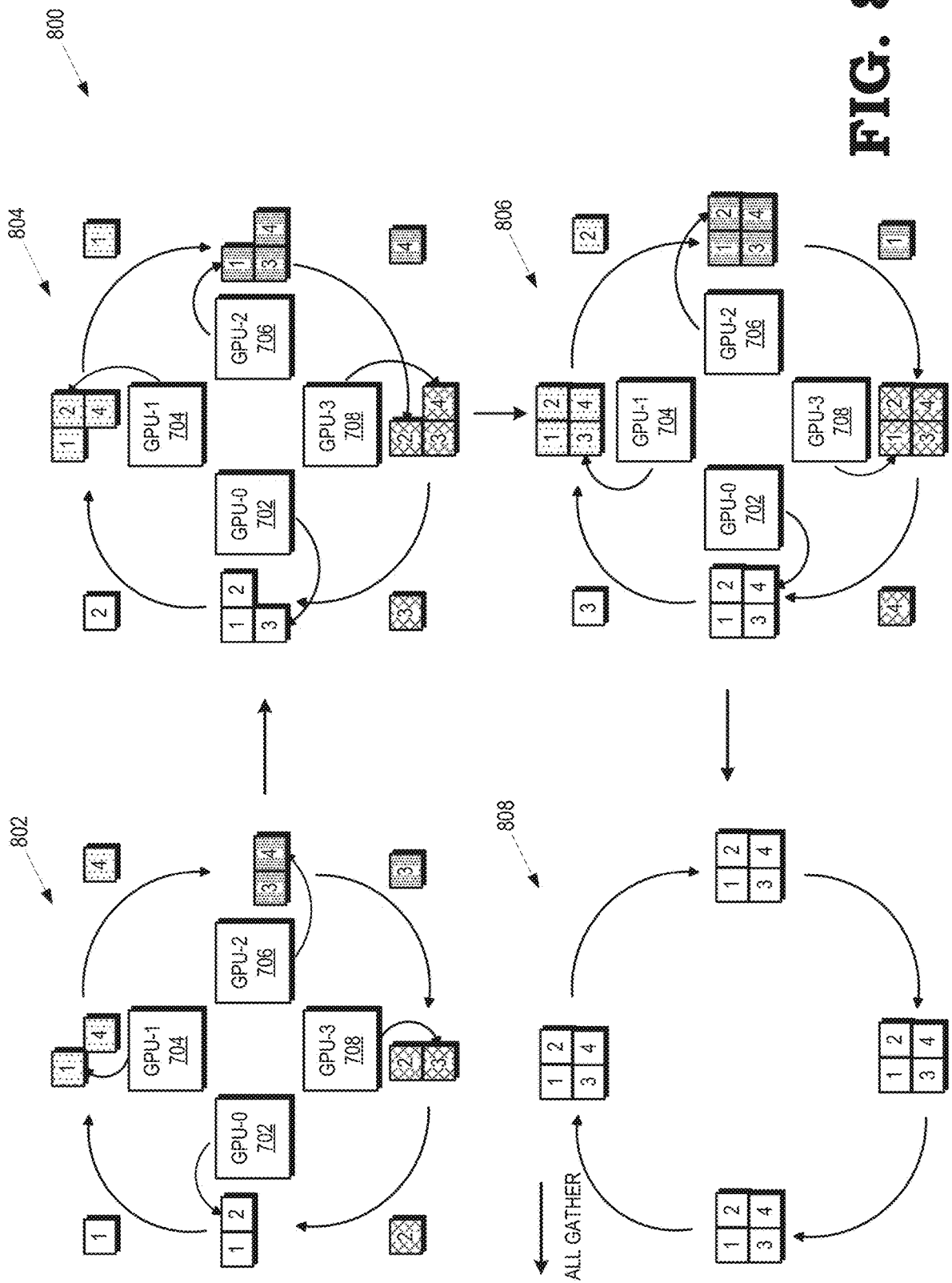
FIG. 8 is a block diagram of fine-grained producer and all-reduce operation executed across a plurality of parallel processors in a ring-based configuration in accordance with some embodiments.

FIG. 8 is a block diagram of an example 800 of fine-grained computation and an all-reduce operation executed across a plurality of parallel processors in a ring-based configuration in accordance with some embodiments. At step 802, each GPU has one block of data generated and ready; GPU-0 702 has block 1, GPU-1 704 has block 4, GPU-2 706 has block 3 and GPU-3 708 has block 2 ready. GPU-0 702 communicates its block 1 to GPU-1 704, while it generates block 2, and reduces it with the version it receives from GPU-3 708. Concurrently, GPU-1 704 communicates block 4 to GPU-2 706, while generating block 1, and reduces it with the version it receives from GPU-0 702. Concurrently, GPU-2 706 communicates block 3 to GPU-3 708 while it generates block 4 and reduces it with the version it receives from GPU-1 704. GPU-3 708 communicates block 2 to GPU-0 702, and simultaneously generates block 3 and reduces it with the version it receives from GPU-2 706. In this way, the blocks are communicated between GPUs at predetermined timings such that the network links between the GPUs are active while the GPUs are computing the blocks, allowing the communications to be hidden by the computations.

At step 804, GPU-0 702 communicates the partially reduced block 2 to GPU-1 704, while it generates block 3, and reduces it with the version it receives from GPU-3 708. Concurrently, GPU-1 704 communicates the partially reduced block 1 to GPU-2 706, while it generates block 2, and reduces it with the version it receives from GPU-0 702. At the same time, GPU-2 706 communicates block 4 to GPU-3 708 while it generates block 1 and reduces it with the version it receives from GPU-1 704. Concurrently, GPU-3

708 communicates block 3 to GPU-0 702, and simultaneously generates block 4 and reduces it with the version it receives from GPU-2 706.

At step 806, GPU-0 702 communicates the partially reduced block 3 to GPU-1 704, while it generates block 4, and reduces it with the version it receives from GPU-3 708. Concurrently, GPU-1 704 communicates the partially reduced block 2 to GPU-2 706, while generating block 3, and reduces it with the version it receives from GPU-0 702. At the same time, GPU-2 706 communicates the partially reduced block 1 to GPU-3 708 while it generates block 2 and reduces it with the version it receives from GPU-1 704. Concurrently, GPU-3 708 communicates the partially reduced block 4 to GPU-0 702, and simultaneously generates block 1 and reduces it with the version it receives from GPU-2 706.

At step 808, each GPU has a completely reduced subarray of blocks 1, 2, 3, and 4 that are ready for an all gather step. By staggering block generation on each device, each device can generate and send different blocks of data at each step, making fuller use of the compute and network resources of the processing system 100.

Figure 9:
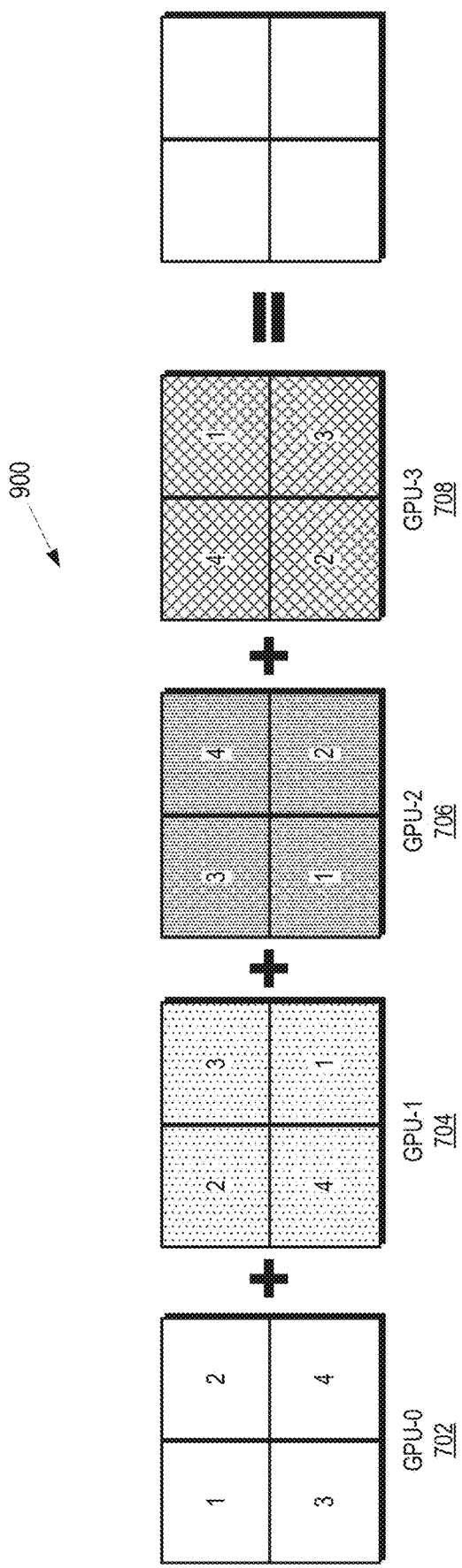
FIG. 9 is a block diagram of an all-reduce operation with the producers' blocks scheduled in a staggered manner across a plurality of parallel processors in accordance with some embodiments.

FIG. 9 is a block diagram 900 of an all-reduce operation with staggered block scheduling across a plurality of parallel processors in accordance with some embodiments. The numbers in each matrix indicate the block execution order for each of GPU-0 702, GPU-1 704, GPU-2 706, and GPU-3 708 in some embodiments. It will be appreciated that more than or fewer than four GPUs participate in distributed computing operations that utilize staggered block scheduling and that the operations may include more than four blocks.

Figure 10:
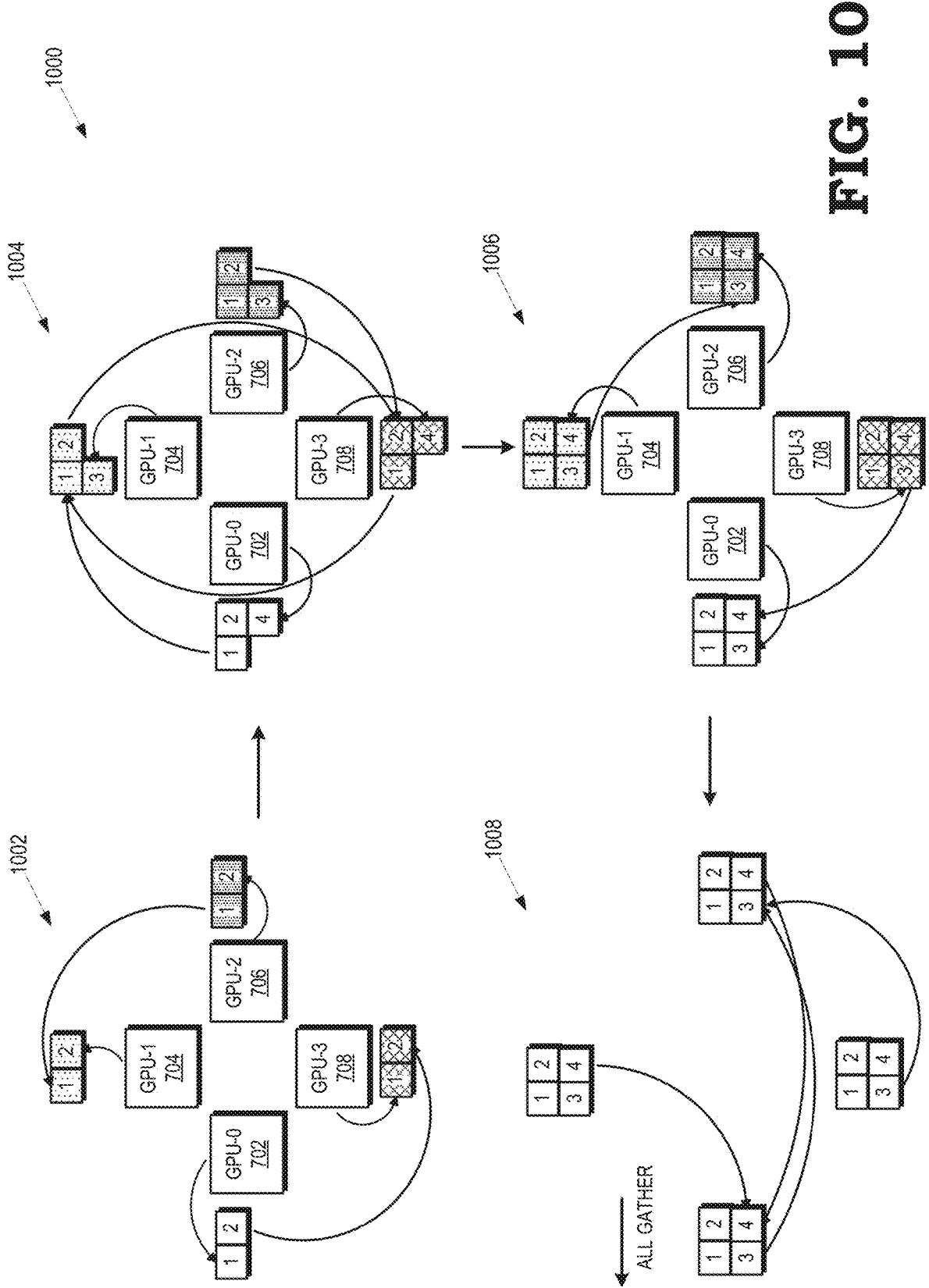
FIG. 10 is a block diagram of fine-grained producer and an all-reduce operation executed across sets of parallel processors in accordance with some embodiments.

In some embodiments, the processing system 100 schedules sets of parallel processors 115 to generate versions of the same block at the same time. The reduction can also be carried out automatically once the output is generated and stored in specialized buffers/memory. This can be done in hardware using in-network or in-memory-based approaches. FIG. 10 is a block diagram 1000 of fine-grained computation and an all-reduce operation executed across sets of parallel processors in accordance with some embodiments. At step 1002, GPU-0 702 and GPU-3 708 generate block 1 while GPU-0 702 communicates block 2 to GPU-3 which concurrently reduces it with its local version and GPU-1 704 and GPU-2 706 generate block 2 while GPU-2 706 communicates block 1 to GPU-1 which concurrently reduces it with its local version. At step 1004, GPU-0 702 and GPU-3 708 generate block 4 while communicating block 1 to GPU-1 704 which concurrently reduces it with its version of block 1 and GPU-1 704 and GPU-2 706 generate block 3 while communicating block 2 to GPU-3 708 which concurrently reduces it with its version of block 2. At step 1006, GPU-0 702 and GPU-3 708 generate block 3 while GPU-3 708 communicates block 4 to GPU-0 702 which concurrently reduces it with its versions of blocks 4 while GPU-1 704 and GPU-2 706 generate block 4 while GPU-1 704 communicates block 3 to GPU-2 706 which concurrently reduces it with its versions of block 3. At step 1008, GPU-0 702 and GPU-3 708 communicate block 3 to GPU-2 706 which concurrently reduces it with its version of block 3 and GPU-1 704 and GPU-2 706 communicate block 4 to GPU-0 702 which concurrently reduces it with its version of block 4. At the end of step 1008, each GPU has a reduced subarray of blocks 1, 2, 3, and 4 that are ready for an all gather step. As illustrated in the example of FIG. 10, each device is solely responsible for reducing a certain block. By splitting the devices into two sets with each set generating blocks in a particular order, the processing system 100 spreads traffic and parallelizes reduction across the devices.

Figure 11:
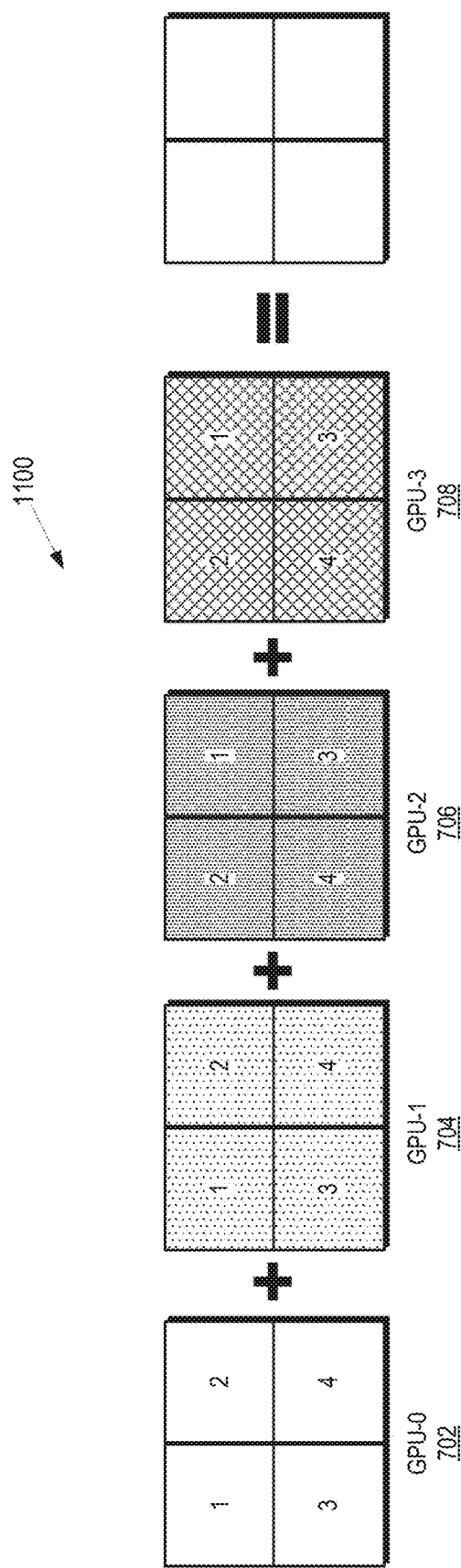
FIG. 11 is a block diagram of an all-reduce operation with the producers' blocks scheduled in a staggered manner across sets of parallel processors in accordance with some embodiments.

FIG. 11 is a block diagram 1100 of an all-reduce operation with staggered block scheduling across sets of parallel processors in accordance with some embodiments. The numbers in each matrix indicate the block execution order for each of GPU-0 702, GPU-1 704, GPU-2 706, and GPU-3 708 in some embodiments. It will be appreciated that more than or fewer than four GPUs participate in distributed computing operations that utilize staggered block scheduling and that the operations may include more than four blocks.

In some embodiments, the kernel invocation API call is modified for programmers to indicate that the output of a producer kernel will need to be reduced across devices in a node, followed by a vector containing participating device IDs. In embodiments in which the output is not reduced or in which all devices in the system participate in the reduction, the vector is omitted. For example, in some embodiments, the API is modified as follows:

launch kernel(kernel_name, grid, WG, . . . , all-reduce, [optional] device_vector)

Unused bits in the kernel packet 500 are used to carry the information of whether reduction is required in some embodiments. For example, if the bits are set to 0, no output reduction is indicated. If the bits are set, the command processor 140 determines the amount of staggering required for the operation during packet inspection.

Figure 12:
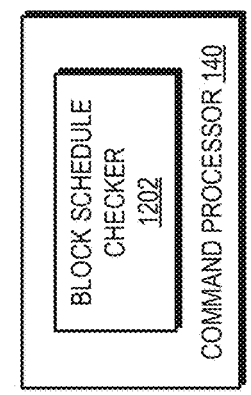
FIG. 12 is a block diagram of the command processor including a block schedule checker in accordance with some embodiments.

FIG. 12 is a block diagram of the command processor 140 including a block schedule checker 1202. Based on the size of data to be reduced, the number of participating devices, and the device ID of the parallel processor 115 in which the command processor 140 is included, the block schedule checker 1202 determines the scheduling order of blocks across parallel processors 115. In some embodiments, the block schedule checker 1202 first determines the chunk_size=#blocks/#GPUs. The block schedule checker 1202 determines the number of blocks from the kernel's workgroup count. Based on the number of blocks, the block schedule checker 1202 shifts the block execution on each participating device (i.e., each participating parallel processor 115) by multiples of the chunk size (i.e., device_id*chunk_size). For example, device 0 is staggered by 0*chunk_size (i.e., no staggering), device 1 is staggered by 1*chunk_size, . . . , device n is staggered by n*chunk_size. In other embodiments, other scheduling policies are implemented by the block schedule checker 1202. In some embodiments, the block schedule checker 1202 is implemented as a hardware extension to the command processor 140 or by modifying the command processor 140 hardware.

Figure 13:
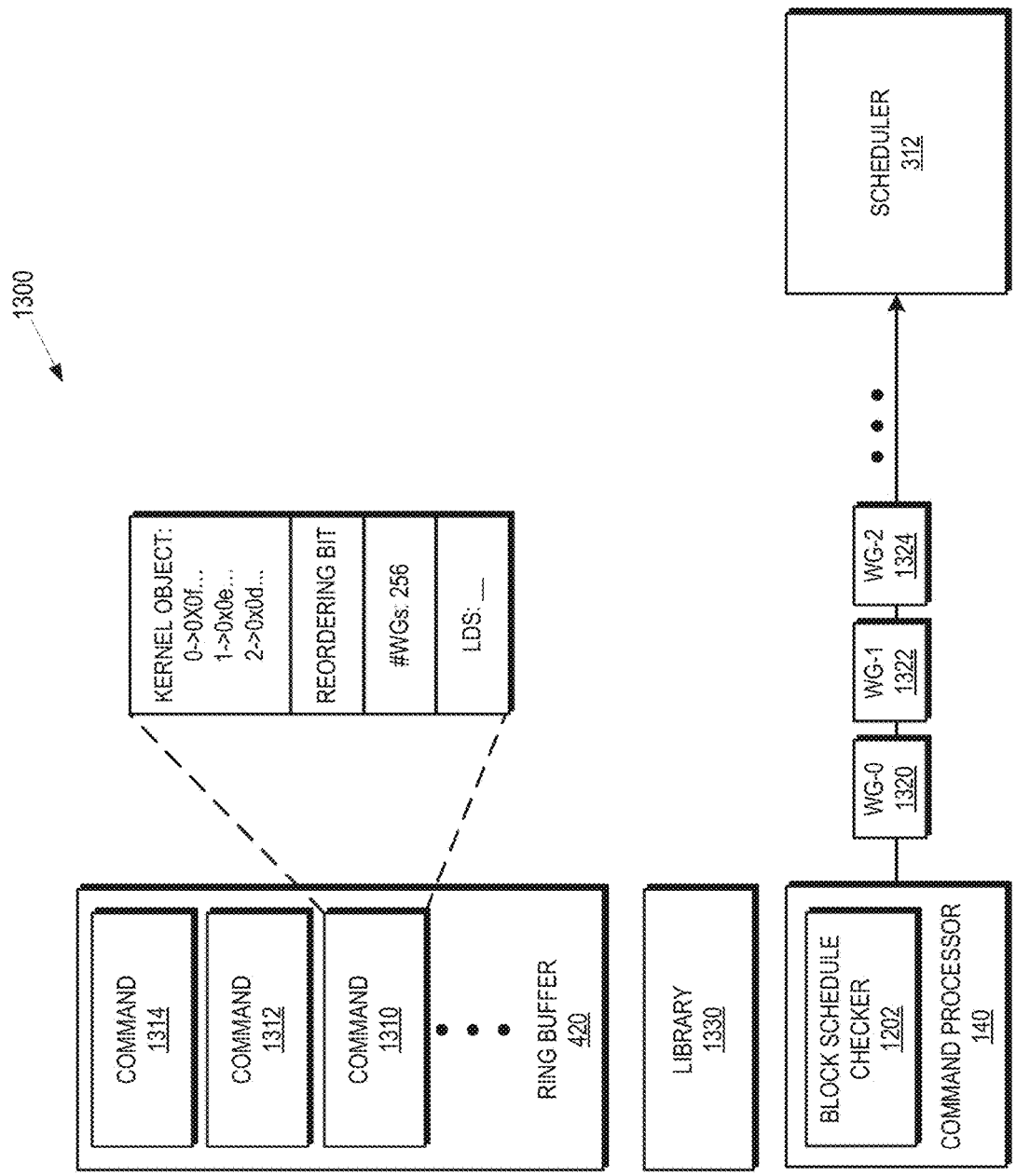
FIG. 13 is a block diagram of a portion of the processing system of FIGS. 1 and 4 implementing data dependency-aware scheduling in accordance with some embodiments.

In embodiments that require a fixed launch order of workgroups, the kernel packet 500 is linked to multiple different implementations of the kernels with staggered output block-to-workgroup mappings, as illustrated in FIG. 13. FIG. 13 illustrates an embodiment of a portion 1300 of the processing system of FIGS. 1 and 4 implementing data dependency-aware scheduling in accordance with some embodiments. The ring buffer 420 or other queue stores commands 1310, 1312, 1314 placed by the runtime 418. The block schedule checker 1202 calculates staggering based on information stored at, e.g., command 1310. Based on the staggering calculated by the block schedule checker 1202, one of the implementations can be selected for execution during runtime by each parallel processor 115 while using a baseline sequential workgroup scheduling strategy such as by sending workgroup WG-0 1320, followed by workgroup WG-1 1322, followed by workgroup WG-2 1324, etc. to the hardware scheduler 412. In such cases, a library 1330 contains and returns a number of different implementations equal to the number of participating parallel processors 115 of the same producer kernel with differing block-to-workgroup mappings, where the mappings are staggered by multiples of size/device count.

In some embodiments, the command processor 140 delays communications between participating parallel processors 115 or modifies the sequence of workgroup execution to ensure the participating parallel processors 115 are in sync during reduction operations. The hardware scheduler 412 on each parallel processor 115 keeps a count of the total blocks per workgroup it has dispatched from the kernel. Once the hardware scheduler 412 has dispatched n (e.g., chunk_size) blocks, the hardware scheduler 412 notifies the command processor 140. The command processor 140 then sets and broadcasts a bit to the other parallel processors 115. Once all the parallel processors 115 have received a total of p bits, where p is the device count, the next set of communication begins. The frequency of the sync can thus be modified by configuring the value of "n". If one or more parallel processors 115 are determined to be lagging, the block schedule checker 1202 modifies the workgroup schedule on each parallel processor 115 to maintain synchronization among the devices.

In some embodiments, the apparatus and techniques described above are implemented in a system including one or more integrated circuit (IC) devices (also referred to as integrated circuit packages or microchips), such as the processing system described above with reference to FIGS. 1-13. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method, comprising:
scheduling, at a command processor, a first subset of one or more workgroups of a first kernel to execute at a parallel processor and generate data that is stored at a cache local to the parallel processor immediately prior to a second subset of one or more workgroups of a second kernel based on data dependencies between the first subset and the second subset, wherein the second subset of one or more workgroups of the second kernel executes at the parallel processor prior to the first kernel completing execution and consumes data stored at the cache that was generated by the first subset of one or more workgroups of the first kernel.

2. The method of claim 1, further comprising:
partitioning, at a runtime, a plurality of workgroups into the first subset of one or more workgroups and the second subset of one or more workgroups based on the data dependencies.

3. The method of claim 2, wherein partitioning is further based on a size and locality of the cache to a set of one or more compute units executing the one or more workgroups of the second subset.

4. The method of claim 2, further comprising:
specifying, by the runtime, a mapping between the first subset of one or more workgroups of the first kernel and the second subset of one or more workgroups of the second kernel.

5. The method of claim 1, wherein a mapping between the first subset of one or more workgroups of the first kernel and the second subset of one or more workgroups of the second kernel is declared in a companion function for each of the first kernel and the second kernel.

6. The method of claim 1, wherein a number of workgroups in the first subset differs from a number of workgroups in the second subset.

7. The method of claim 1, further comprising:
inserting a barrier into a kernel packet to delay execution of the second subset of one or more workgroups until the first subset of one or more workgroups has completed execution.

8. The method of claim 7, further comprising:
initializing a counter by a number of workgroups of the first subset of one or more workgroups that must complete execution prior to the second subset of one or more workgroups executing; and
decrementing the counter in response to a workgroup reaching the barrier.

9. The method of claim 1, further comprising:
generating a command describing pairings of two or more kernels based on the data dependencies; and
scheduling the one or more workgroups of the first subset and the one or more workgroups of the second subset to execute at a processor based on the command.

10. The method of claim 9, further comprising:
placing the command and an identifier of a kernel launch for the one or more workgroups of the first subset and the one or more workgroups of the second subset in a ring buffer; and
scheduling workgroups at a command processor based on the command and the identifier.

11. A parallel processor, comprising:
a cache; and
a command processor configured to:
schedule a first subset of one or more workgroups of a first kernel to execute at aa the parallel processor and produce data that is stored at the cache; and
schedule a second subset of one or more workgroups of a second kernel to execute at the parallel processor immediately after execution of the first subset and prior to the first kernel completing execution, based on data dependencies between the first subset and the second subset, wherein the second subset of one or more workgroups consumes data stored at the cache that was generated by the first subset of one or more workgroups.

12. The command processor of claim 11, wherein a number of workgroups in the first subset differs from a number of workgroups in the second subset.

13. The command processor of claim 11, further configured to:
schedule the second subset based on a barrier inserted into a kernel packet to delay execution of the second subset of one or more workgroups until the first subset of one or more workgroups has completed execution.

14. The command processor of claim 13, further configured to:
initialize a counter by a number of workgroups of the second subset of one or more workgroups that must complete execution prior to the first subset of one or more workgroups executing; and
decrement the counter in response to a workgroup reaching the barrier.

15. The command processor of claim 11, further configured to:
generate a command describing pairings of two or more kernels based on the data dependencies; and
schedule the one or more workgroups of the first subset and the one or more workgroups of the second subset to execute at a processor based on the command.

16. The command processor of claim 15, further configured to:
place the command and an identifier of a kernel launch for the one or more workgroups of the first subset and the one or more workgroups of the second subset in a ring buffer; and
schedule workgroups at a command processor based on the command and the identifier.

17. A processing system, comprising:
a parallel processor comprising:
a command processor configured to schedule a first subset of one or more workgroups of a first kernel to execute and produce data that is stored at a cache immediately prior to a second subset of one or more workgroups of a second kernel, wherein the second subset of one or more workgroups consumes data stored at the cache that was generated by the first subset of one or more workgroups and executes and prior to the first kernel completing execution.

18. The processing system of claim 17, wherein a number of workgroups in the first subset of one or more workgroups differs from a number of workgroups in the second subset of one or more workgroups.

19. The processing system of claim 17, further comprising:
a runtime configured to insert a barrier into a kernel packet to delay execution of the second subset of one or more workgroups until the first subset of one or more workgroups has completed execution.

20. The processing system of claim 19, wherein the runtime is further configured to: initialize a counter by a number of workgroups of the first subset of one or more workgroups that must complete execution prior to the second subset of one or more workgroups executing; and
decrement the counter in response to a workgroup reaching the barrier.

21. The processing system of claim 17, further comprising:
a runtime configured to generate a command describing pairings of two or more kernels based on data dependencies among workgroups of the two or more kernels, wherein
the command processor is further configured to schedule the first subset of one or more workgroups and the second subset of one or more workgroups to execute at a processor based on the command.

22. The processing system of claim 21, further comprising:
a ring buffer, wherein
the runtime is further configured to place the command and an identifier of a kernel launch for the first subset of one or more workgroups and the second subset of one or more workgroups in the ring buffer; and
the command processor is further configured to schedule workgroups based on the command and the identifier.

* * * * *